United States Patent
Gilmour et al.

(10) Patent No.: US 10,576,868 B1
(45) Date of Patent: Mar. 3, 2020

(54) CARGO TIE-DOWN AND A COMBINATION CARGO TIE-DOWN AND RAIL, AND A METHOD OF SECURING THE CARGO TIE-DOWN TO A RAIL

(71) Applicant: Mashak Gilmour Company LLC, Winneconne, WI (US)

(72) Inventors: Mark R. Gilmour, Winneconne, WI (US); Adam W. Gilmour, Berlin, WI (US); Aron C. Mashak, Winneconne, WI (US)

(73) Assignee: Mashak Gilmour Company LLC, Winneconne, WI (US)

( * ) Notice: Subject to any disclaimer, the term of this patent is extended or adjusted under 35 U.S.C. 154(b) by 0 days.

(21) Appl. No.: 16/182,704

(22) Filed: Nov. 7, 2018

(51) Int. Cl.
  *B60P 7/08* (2006.01)
(52) U.S. Cl.
  CPC ........... *B60P 7/0807* (2013.01); *B60P 7/0815* (2013.01)
(58) Field of Classification Search
  CPC .......... B60P 7/08; B60P 7/0807; B60P 7/0815
  USPC ....... 410/101, 104, 105, 106, 108, 109, 110, 410/112, 113, 115, 116
  See application file for complete search history.

(56) References Cited

U.S. PATENT DOCUMENTS

| | | | |
|---|---|---|---|
| 2,688,289 A | | 9/1954 | Sterling |
| 3,765,637 A | * | 10/1973 | Watts ........................ B60P 7/13 410/116 |
| 4,545,697 A | | 10/1985 | Verdenne et al. |
| 4,570,987 A | * | 2/1986 | Wong ........................ B66C 1/66 248/499 |
| 4,630,982 A | | 12/1986 | Fenner |
| 4,641,986 A | * | 2/1987 | Tsui ........................ B66C 1/66 24/115 K |
| 4,969,784 A | * | 11/1990 | Yanke .................... B60P 7/0815 410/104 |
| 5,248,176 A | * | 9/1993 | Fredriksson .............. B66C 1/34 248/499 |
| 5,273,382 A | * | 12/1993 | Yearick ................. F16B 13/066 411/64 |
| 5,707,188 A | * | 1/1998 | Longstreet ............ B60P 7/0823 24/135 A |

(Continued)

FOREIGN PATENT DOCUMENTS

| | | | | |
|---|---|---|---|---|
| DE | 4336779 A1 | * | 4/1995 | ............ B60P 7/0807 |
| EP | 1108608 | | 7/2006 | |
| FR | 3072919 A1 | * | 5/2019 | ............ B60P 7/0807 |

*Primary Examiner* — Hilary L Gutman
(74) *Attorney, Agent, or Firm* — Thomas J. Connelly; Northwind IP Law, S.C.

(57) ABSTRACT

A cargo tie-down includes an adapter with threaded bore formed therethrough, and a stepped outer circumference forming a second portion. A locking collar with threaded bore formed therethrough has a first and second cavity, where the first cavity rotatably mates with the second portion of the adapter. A disk has a bore formed therethrough, a cavity with a bottom wall, and an outer diameter mating with the second cavity of the locking collar. A spring positioned in the second cavity of the locking collar contacts the bottom wall of the disk. A T-shaped threaded stud has an outwardly extending flange formed on a first end. The stud passes through the disk and is threaded into both the locking collar and the adapter. An attachment member threaded into the bore of the adapter contacts a second end of the stud to cause the adapter and the stud to move in unison.

21 Claims, 4 Drawing Sheets

(56) References Cited

U.S. PATENT DOCUMENTS

| | | | |
|---|---|---|---|
| 5,746,535 A | 5/1998 | Kohler | |
| 6,022,164 A | 2/2000 | Tsui et al. | |
| 6,161,884 A * | 12/2000 | Pearl | B66C 1/66 |
| | | | 248/499 |
| 6,578,889 B2 * | 6/2003 | Pearl | B66C 1/66 |
| | | | 248/499 |
| 6,585,465 B1 | 7/2003 | Hammond et al. | |
| 6,612,631 B1 * | 9/2003 | Pearl | B66C 1/66 |
| | | | 248/499 |
| 6,712,568 B2 | 3/2004 | Snyder et al. | |
| 7,156,593 B1 | 1/2007 | Saward et al. | |
| 8,550,757 B2 | 10/2013 | Anderson et al. | |
| 9,987,967 B1 * | 6/2018 | Kimble | B60P 7/0807 |
| 2002/0048495 A1 * | 4/2002 | Anderson | B60P 7/0815 |
| | | | 410/104 |
| 2017/0136936 A1 | 5/2017 | Lamoureux | |
| 2018/0141481 A1 | 5/2018 | Gomes et al. | |

\* cited by examiner

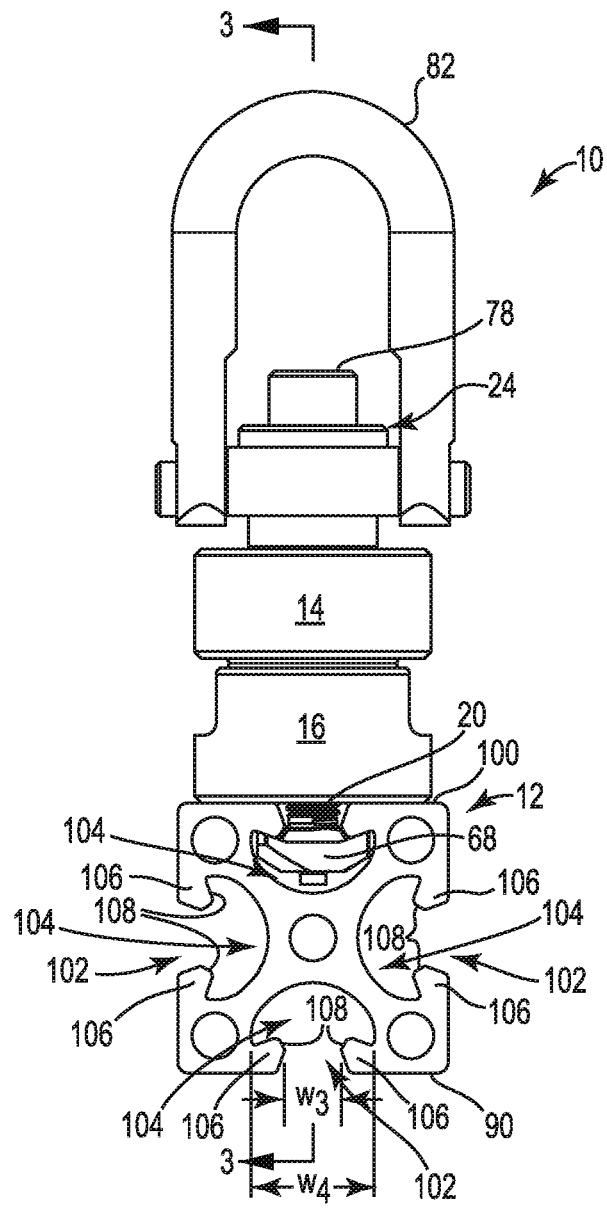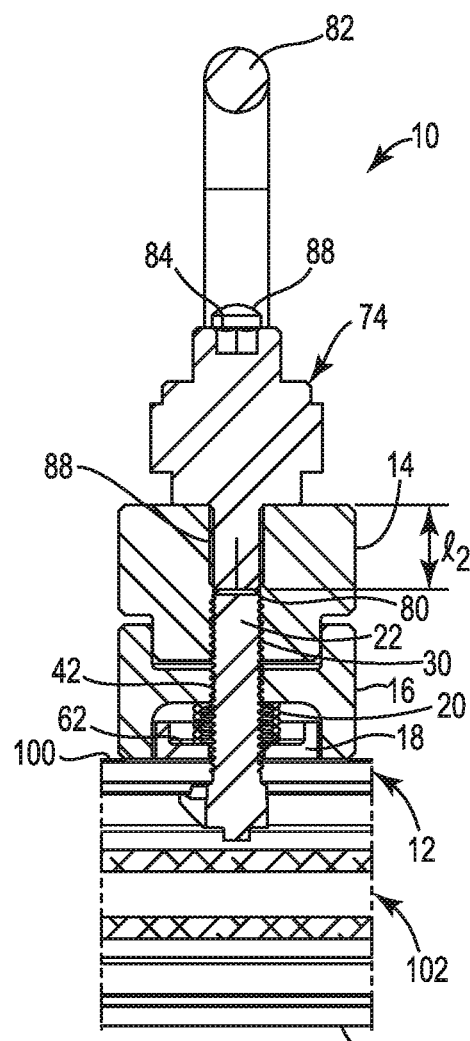
Fig. 2
Fig. 3

CARGO TIE-DOWN AND A COMBINATION CARGO TIE-DOWN AND RAIL, AND A METHOD OF SECURING THE CARGO TIE-DOWN TO A RAIL

FIELD OF THE INVENTION

This invention relates to a cargo tie-down, a combination cargo tie-down and rail, and a method of securing a cargo tie-down to a rail.

BACKGROUND OF THE INVENTION

Cargo tie-downs are used on movable members such as: trucks, pick-up trucks, trailers, flat bed trucks, aircraft, railway cars, boats, ships, vessels, barges, and the like to hold various kinds of cargo secure during transport. The cargo tie-downs can include various sizes and styles of fittings, such as loops, closed loops, hooks, rings, D-rings, clips, eyes or various structures through which ropes, cords, straps, chains, metal bands, and the like, can be fastened to secure, lash or bind the cargo in place. It is advantageous that the cargo tie-downs be easily inserted into a rail and be locked or affixed in a desired location. The cargo tie-downs need to be self-locking to avoid accidental loosening or dislodgement under the most rigorous conditions. The cargo tie-downs should be simple in construction, inexpensive to manufacture, and easy to use. A quick and easy attachment of the cargo tie-downs to a rail, which is secured to a truck, trailer, flat bed truck, etc. saves time and money. The cargo tie-downs should be designed to be easily attached to and later be removable from the rail. When the cargo tie-downs are no longer needed to secure a load, they can be stored until they are needed again. Furthermore, the cargo tie-downs should be readily movable and adjustable along the rail so as to accommodate irregular shaped loads.

Now, a cargo tie-down, a combination cargo tie-down and rail, and a method of securing a cargo tie-down to a rail, has been invented which satisfies the above mentioned requirements.

SUMMARY OF THE DISCLOSURE

Briefly, this invention relates to a cargo tie-down, a combination cargo tie-down and rail, and a method of securing a cargo tie-down to a rail. The cargo tie-down includes an adapter having a first surface, an oppositely aligned second surface, and a threaded bore extending therethrough. The adapter also has a stepped outer circumference which forms a first portion having an external diameter, and a second portion having an external diameter. The second portion is located adjacent to the second surface. The cargo tie-down also includes a locking collar having a first surface, an oppositely aligned second surface, a threaded bore formed therethrough, a first cavity formed adjacent to the first surface, and a second cavity formed adjacent to the second surface. The first cavity has an internal diameter sized to rotatable mate with the external diameter of the second portion of the adapter. The cargo tie-down further includes a disk having a first surface, an oppositely aligned second surface, and a bore formed therethrough. The disk also has a cavity formed adjacent to the first surface which has a bottom wall. The disk further has an outer diameter which is sized to mate with the second cavity of the locking collar. A spring is positioned in the second cavity of the locking collar and contacts the bottom wall of the disk. A T-shaped threaded stud having a first end and an oppositely aligned second end passes through the disk and is threaded into the locking collar and the adapter. The first end of the T-shaped threaded stud has an outwardly extending flange. The T-shaped threaded stud also includes threads which extend from the flange to the second end. The threads have an outside diameter. The flange has a pair of sidewalls and a pair of end walls. The pair of sidewalls is separated by a width equal to the outside diameter of the threads, and each of the pair of end walls is aligned at an angle to the pair of sidewalls. Lastly, the cargo tie-down includes an attachment member threaded into the threaded bore of the adapter and which contacts the second end of the T-shaped threaded stud and causes the adapter and the T-shaped threaded stud to move in unison.

In a second embodiment, the cargo tie-down includes an adapter having a first surface, an oppositely aligned second surface, and a threaded bore extending therethrough. The adapter also has a stepped outer circumference which forms a first portion having an external diameter, and a second portion having an external diameter. The second portion is located adjacent to the second surface. The cargo tie-down also includes a locking collar having a first surface, an oppositely aligned second surface, a threaded bore formed therethrough, a first circular cavity formed adjacent to the first surface, and a second circular cavity formed adjacent to the second surface. The first cavity has an internal diameter sized to rotatable mate with the external diameter of the second portion of the adapter. The cargo tie-down further includes a disk having a first surface, an oppositely aligned second surface, a bore formed therethrough, and a circular cavity formed adjacent to the first surface and having a bottom wall. The disk also has an outer diameter which is sized to mate with the second cavity of the locking collar. A spring is positioned in the second cavity of the locking collar and contacts the bottom wall of the disk. A T-shaped threaded stud having a first end and an oppositely aligned second end passes through the disk and is threaded into the locking collar and the adapter. The first end of the T-shaped threaded stud has an outwardly extending flange. The T-shaped threaded stud also includes threads which extend from the flange to the second end. The threads have an outside diameter. The flange has a pair of sidewalls and a pair of end walls. The pair of sidewalls is separated by a width equal to the outside diameter of the threads, and each of the pair of end walls is aligned at an angle to the pair of sidewalls. Lastly, the cargo tie-down includes an attachment member having a first end and an oppositely aligned second end. The first end has a closed loop fitting secured thereto and the second end has a threaded stud extending outward therefrom. The threaded stud is sized to engage with the threaded bore formed in the adapter and the threaded stud has a length sufficient to contact the second end of the T-shaped threaded stud and cause the adapter and the T-shaped threaded stud to move in unison.

A combination is taught which includes a rail secure to a surface of a movable member. The rail has an elongated channel with a narrow slot defined by a pair of laterally facing projections which form an inverted generally T-shaped passage. The cargo tie-down includes an adapter having a first surface, an oppositely aligned second surface, and a threaded bore extending therethrough. The adapter also has a stepped outer circumference which forms a first portion having an external diameter, and a second portion having an external diameter. The second portion is located adjacent to the second surface. The cargo tie-down also includes a locking collar having a first surface, an oppositely aligned second surface, a threaded bore formed therethrough, a first cavity formed adjacent to the first surface, and a second cavity formed adjacent to the second surface. The first cavity has an internal diameter sized to rotatable mate with the external diameter of the second portion of the adapter. The cargo tie-down further includes a disk having a first surface, an oppositely aligned second surface, a bore formed therethrough, and a cavity formed adjacent to the first surface and having a bottom wall. The disk also has an outer diameter which is sized to mate with the second cavity of the locking collar. A spring is positioned in the second cavity of the locking collar and contacts the bottom wall of the disk. A T-shaped threaded stud having a first end and an oppositely aligned second end passes through the disk and is threaded into the locking collar and the adapter. The first end of the T-shaped threaded stud has an outwardly extending flange. The T-shaped threaded stud also includes threads which extend from the flange to the second end. The threads have an outside diameter. The flange has a pair of sidewalls and a pair of end walls. The pair of sidewalls is separated by a width equal to the outside diameter of the threads, and each of the pair of end walls is aligned at an angle to the pair of sidewalls. Lastly, the cargo tie-down includes an attachment member having a first end and an oppositely aligned second end. The first end has a closed loop fitting secured thereto and the second end has a threaded stud extending outward therefrom. The threaded stud is sized to engage with the threaded bore formed in the adapter. The threaded stud has a length sufficient to contact the second end of the T-shaped threaded stud and cause the adapter and the T-shaped threaded stud to move in unison. Two or more cargo tie-downs can be quickly and easily attached to two or more rails, at any point along their length, and can be locked in place by rotating each of the cargo tie-downs. A rope, strap, or band can then be secured to the closed loop fitting of each tie-down and extend around or over the load to secure the load to the movable member. When the cargo load is removed from the movable member, the tie-downs can also be removed and be stored until needed again.

A method of securing a cargo tie-down to a rail is also taught. The rail has an elongated channel with a narrow opening defined by a pair of laterally facing projections which connect with an enlarged cavity formed in the rail. The enlarged cavity has an interior surface. The cargo tie-down includes an adapter having a first surface, an oppositely aligned second surface, and a threaded bore extending therethrough. The adapter has a stepped outer circumference which forms a first portion having an external diameter, and a second portion having an external diameter. The second portion is located adjacent to the second surface. A locking collar is also present which has a first surface, an oppositely aligned second surface, and a threaded bore formed therethrough. The locking collar has a first cavity formed therein adjacent to the first surface and a second cavity formed therein adjacent to the second surface. The first cavity also has an internal diameter sized to rotatably mate with the external diameter of the second portion of the adapter. The cargo tie-down also includes a disk having a first surface, an oppositely aligned second surface, and a bore formed therethrough. The disk has a cavity formed adjacent to the first surface. The cavity has a bottom wall. The disk has an outer diameter which is sized to mate with the second cavity of the locking collar. A spring is positioned in the second cavity of the locking collar and contacts the bottom wall of the disk. The cargo tie-down also includes a T-shaped threaded stud having a first end and an oppositely aligned second end. The first end of the T-shaped threaded stud has an outwardly extending flange. The T-shaped threaded stud also includes threads which extend from the flange to the second end. The threads have an outside diameter. The flange has a pair of sidewalls and a pair of end walls. The pair of sidewalls is separated by a width equal to the outside diameter of the threads. Each of the pair of end walls is aligned at an angle to the pair of sidewalls. The cargo tie-down further includes an attachment member having a first end and an oppositely aligned second end. The first end has a loop fitting secured thereto and the second end has a threaded stud extending outward therefrom. The threaded stud is sized to be threaded into the threaded bore formed in the adapter. The threaded stud has a length sufficient to contact the second end of the T-shaped threaded stud and cause the adapter and the T-shaped threaded stud to move in unison. The method includes the steps of positioning the flange of the T-shaped threaded stud in the elongated channel. The cargo tie-down is then depressed which causes the spring to compress and allows the flange to move downward into the enlarged cavity and below a plane of the pair of laterally facing projections. The flange can then be rotated from between about 5° to about 45°. Lastly, the spring is allowed to relax which causes the pair of end walls of the flange to contact the interior surface of the enlarged cavity and lock the cargo tie-down to the rail.

The general object of this invention is to provide a cargo tie-down which can be used to secure a load on a movable member, such as a truck, a pick-up truck, a trailer, a flat bed truck, an aircraft, a railway car, a boat, a ship, a vessel, a barge, and the like. A more specific object of this invention is to provide a cargo tie-down which can quickly and easily be locked into an elongated rail which is secured to a movable member, and which can include various sizes and styles of fittings through which ropes, cords, straps, chains, metal bands and the like, can be attached.

Another object of this invention is to provide a cargo tie-down which is simple in construction, inexpensive to manufacture, and easy to use.

A further object of this invention is to provide a cargo tie-down which is self-locking to avoid accidental loosening or dislodgement under the most rigorous conditions.

Still another object of this invention is to provide a combination rail and cargo tie-down.

Still further, an object of this invention is to provide a method of affixing a cargo tie-down to a rail which can be accomplished easily and quickly.

Still further, an object of this invention is to provide a cargo tie-down which can be removed from a rail secured to a movable member and be stored until needed again.

Other objects and advantages of the present invention will become more apparent to those skilled in the art in view of the following description and the accompanying drawings.

BRIEF DESCRIPTION OF THE DRAWINGS

FIG. 2 is a side view of the cargo tie-down and elongated rail shown in FIG. 1.

FIG. 3 is a cross-sectional view of the cargo tie-down shown in FIG. 2 taken along line 3-3.

DETAILED DESCRIPTION OF THE INVENTION

Figure 1:
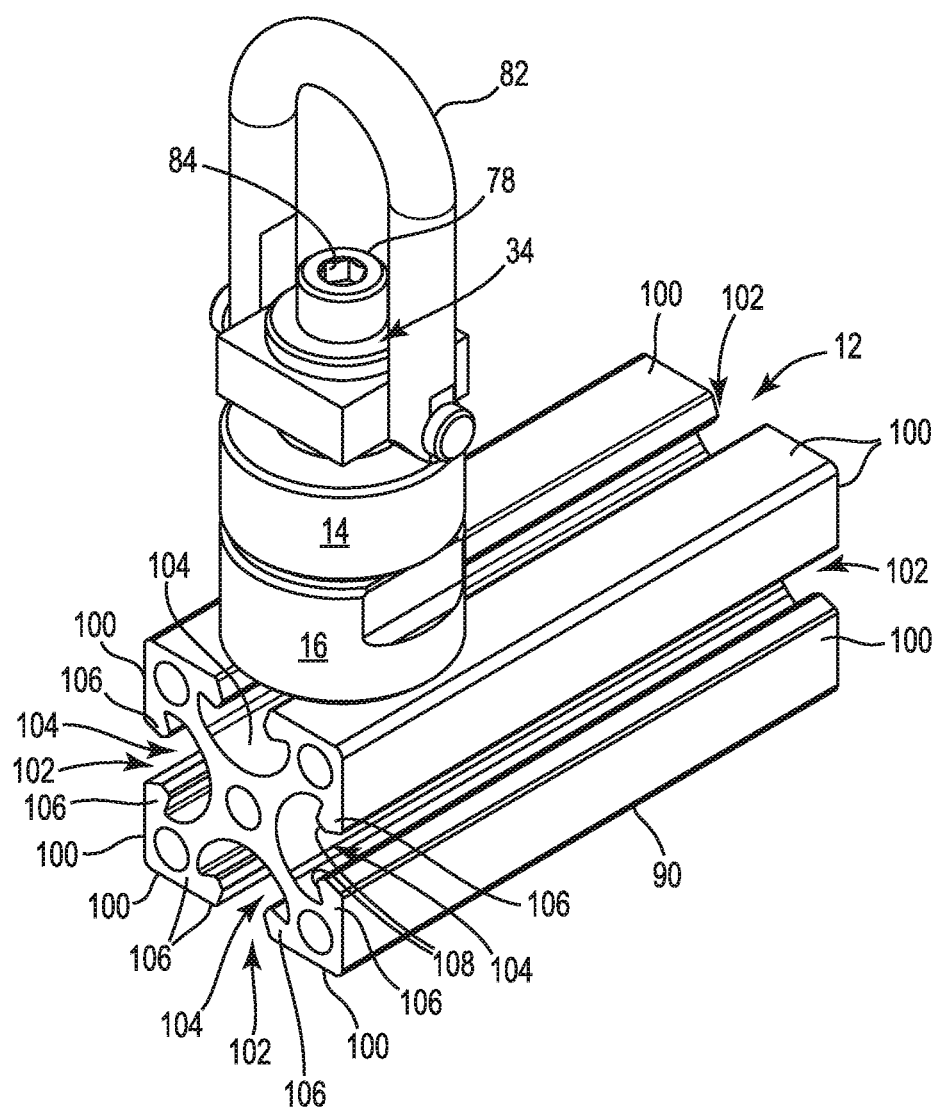
FIG. 1 is a perspective view of a cargo tie-down secured to an elongated rail.

Referring to FIGS. 1-3, a cargo tie-down 10 is shown secured to a rail 12. Two or more cargo tie-downs 10 can be secured to a single rail 12 or to two or more rails 12 in order to secure a load therebetween. The rails 12, 12 can be formed on or attached to a movable member. By "movable member" it is meant a device or structure for transporting persons or things. The movable member does not have to have a motor or engine and does not need to be self-propelled. Examples of various movable members include but are not limited to: a pick-up truck, a trailer, a flat bed truck, an aircraft, a railway car, a boat, a ship, a vessel, a barge, and the like. The cargo tie-downs 10 are designed to cooperate with straps, bands, chains, ropes, etc. to hold various kinds of cargo loads secure during transport. The cargo tie-down 10 can be manufactured in various sizes and can include various styles of fittings, such as loops, closed loops, hooks, rings, D-rings, clips, eyes or various structures through which ropes, cords, straps, chains, metal bands, and the like, can be fastened to secure, lash or bind a cargo load in place.

The cargo tie-down 10 can be formed from almost any kind of material. The material can be a hard, ferrous metallic material or an alloy thereof. By "ferrous" it is meant of, or relating to, or containing iron, especially with a valence 2 or a valence lower than in a corresponding ferric compound. By "metallic" it is meant of, or relating to, or having the characteristics of a metal. For example, the cargo tie-down 10 can be formed or constructed from a metal, a metal alloy, steel, a steel alloy, stainless steel, titanium, a titanium alloy, magnesium, a magnesium alloy, manganese, a manganese alloy, etc. The cargo tie-down 10 can be formed from a non-metallic material. By "non-metallic" it is meant a non-metal. For example, the cargo tie-down could be formed from aluminum or an aluminum alloy. By "aluminum" it is meant a silvery-white ductile metallic element, found chiefly in bauxite. By "aluminum alloy" it is meant a homogeneous mixture or solid solution of two or more metals, the atoms of one replacing or occupying interstitial positions between the atoms of the other. Alternatively, the cargo tie-down 10 could be formed from a softer material, such as a thermoplastic, a plastic, a fiberglass, a graphic, or a composite material. Desirably, the cargo tie-down 10 is formed from a metal, a metal alloy, steel, stainless steel, zinc, brass, bronze, nickel, plastic, graphic or a composite material. More desirably, the cargo tie-down 10 is formed from a yellow zinc dichromate. A "dichromate" is a compound containing the divalent negative ion, $Cr_2O_7$, usually a characteristic orange-red color.

The cargo tie-down 10 includes an adapter 14, a locking collar 16, a disk 18, a spring 20, a T-shaped threaded stud 22, and an attachment member 24.

Figure 4:
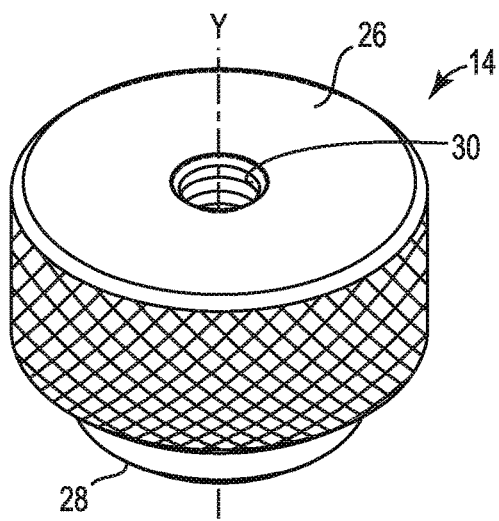
FIG. 4 is a perspective view of an adapter.
Figure 5:
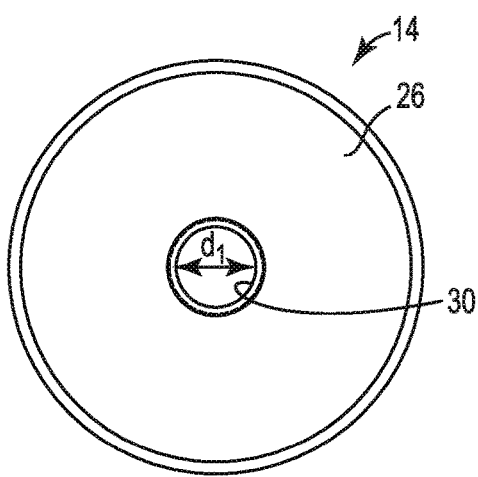
FIG. 5 is a top view of the adapter shown in FIG. 4.
Figure 6:
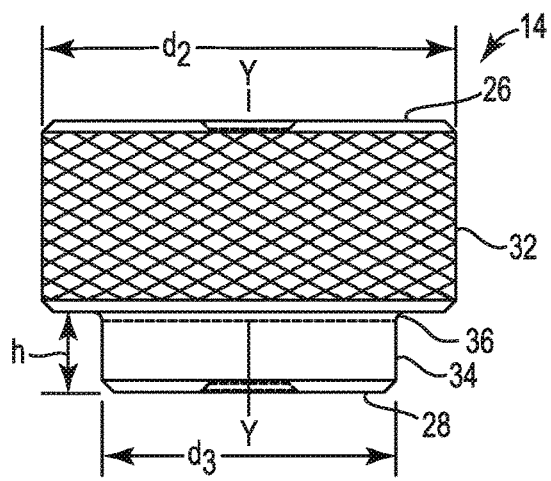
FIG. 6 is a side view of the adapter shown in FIG. 4.

Referring now to FIGS. 4-6, the adapter 14 is shown having a cylindrical configuration with a circular cross-sectional shape. The adapter 14 has a longitudinal central axis Y-Y, see FIG. 4. The adapter 14 could have a non-circular cross-section, if desired. The adapter 14 has a first or upper surface 26, an oppositely aligned second or lower surface 28, and a threaded bore 30 extending therethrough. The threads formed in the treaded bore 30 can vary. The threaded bore 30 has an internal diameter $d_1$. The internal diameter $d_1$ can vary in size. Desirably, the internal diameter $d_1$ will be at least about 0.25 inches for a typical cargo tie-down 10 designed to fit onto a rail 12 secured to a pick-up truck.

The first surface 26 can be flat or planar and smooth. The second surface 28 can also be flat or planar and smooth. By "planar" it is meant of, relating to, or situated in a plane. The adapter 14 has a stepped outer circumference which forms a first portion 32, a second portion 34 and a shoulder 36 located therebetween, see FIG. 6. By "shoulder" it is meant the area of an item or object that serves as an abutment or surrounds a projection. The first portion 32 has an external diameter $d_2$ and the second portion 34 has an external diameter $d_3$. The external diameters $d_2$ and $d_3$ can vary in dimension. For a typical cargo tie-down 10, used on a normal size pick-up truck, the external diameter $d_2$ can be about 1.25 inches and the external diameter $d_3$ can be about 0.95 inches. However, it should be understood that the cargo tie-down 10 can be manufactured in various sizes and therefore the dimensions of the various components can vary. Typically, as the size of the cargo load increases, the physical size of the cargo tie-down 10 will also increase.

Still referring to FIG. 6, the second portion 34 has a height h measured parallel to the longitudinal central axis Y-Y. The height h can vary. Desirably, the height h is less than about 0.5 inches. More desirably, the height h is less than about 0.4 inches. Even more desirably, the height h is less than about 0.3 inches. Most desirably, the height h is about 0.25 inches or less.

The first portion 32 of the adapter 14 is located adjacent to the first surface 26 and the second portion 34 of the adapter 14 is located adjacent to the second surface 28. The external diameter $d_7$ of the first portion 32 is larger than the external diameter $d_3$ of the second portion 34. Desirably, the external diameter $d_2$ of the first portion 32 is at least about 0.1 inches larger than the external diameter $d_3$ of the second portion 34. More desirably, the external diameter $d_2$ of the first portion 32 is at least about 0.2 inches larger than the external diameter $d_3$ of the second portion 34. Even more desirably, the external diameter $d_2$ of the first portion 32 is at least about 0.4 inches larger than the external diameter $d_3$ of the second portion 34.

The first portion 32 has a non-smooth outer circumference. Desirably, the first portion 32 has a knurled outer circumference. By "knurled" it is meant one of a series of small ridges or grooves on the surface or edge of a metal object to aid in gripping. Alternatively, the outer circumference of the first portion 32 could be formed as an abrasive surface or be machined to have one or more rings, slots, grooves, etc. formed therein to aid in gripping. The second portion 34 has a smooth outer circumference.

Figure 8:
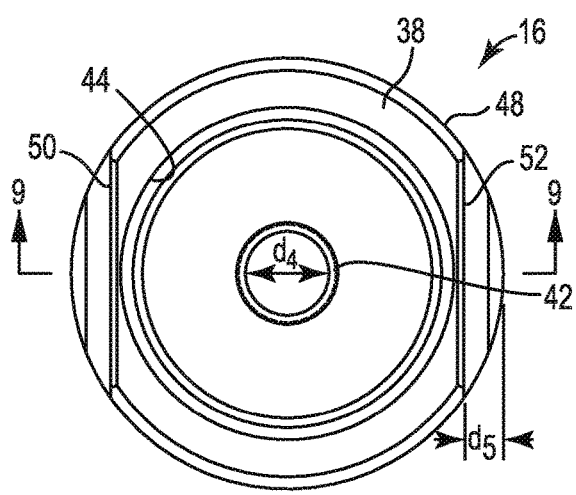
FIG. 8 is a top view of the locking collar shown in FIG. 7.
Figure 9:
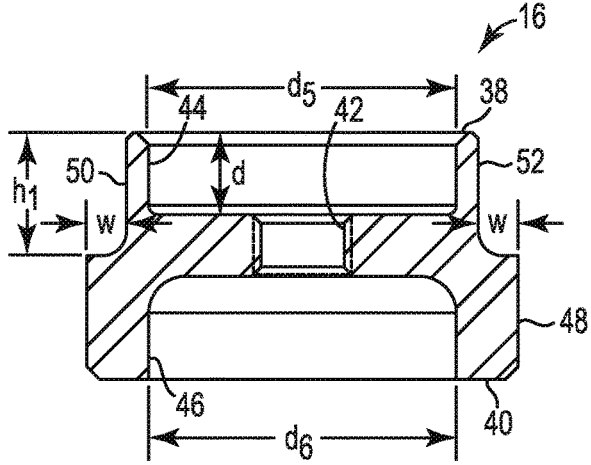
FIG. 9 is a cross-sectional view of the locking collar shown in FIG. 8 taken along line 9-9.
Figure 7:
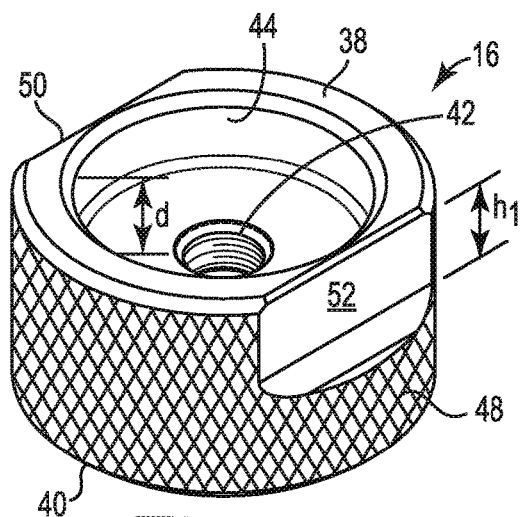
FIG. 7 is a perspective view of a locking collar.

Referring now to FIGS. 7-9, the cargo tie-down 10 also has a locking collar 16 which includes a first surface 38, an oppositely aligned second surface 40, and a threaded bore 42 formed therethrough. The threads formed in the treaded bore 42 can vary. The threaded bore 30 formed in the adapter 14 will be axially aligned with the threaded bore 42 formed in the locking collar 16. In addition, the threaded bore 30 formed through the adapter 14 has an internal diameter $d_1$ and the threaded bore 42 formed through the locking collar 16 has an internal diameter $d_4$, see FIG. 8. The internal diameter $d_1$ of the threaded bore 30 formed through the adapter 14 is equal in diameter to the internal diameter $d_4$ of the threaded bore 42 formed through the locking collar 16. Furthermore, the threads formed through the threaded bore 30 should match the threads formed through the threaded bore 42.

Still referring to FIGS. 7-9, the locking collar 16 is shown having a cylindrical configuration with a circular cross-section. Alternatively, the locking collar 16 could have a non-circular cross-section, if desired. Desirably, the first cavity 44 has a circular cross-section. The locking collar 16 has a first cavity 44 formed therein, adjacent to the first surface 38. The first cavity 44 has a depth d, see FIG. 9, which is greater than the height h of the second portion 34 of the adapter 14, see FIG. 6. This size difference will allow the second portion 34 of the adapter 14 to be inserted into the first cavity 44 such that the first surface 38 of the locking collar 16 can contact the lower surface of the first portion 32 of the adapter 14.

The locking collar 16 also has a second cavity 46 formed therein, adjacent to the second surface 40. Desirably, the second cavity 46 has a circular cross-section. The first cavity 44 has an internal diameter $d_5$, see FIG. 9, which is sized to rotatably mate with the external diameter $d_3$, see FIG. 6, of the second portion 34 of the adapter 14. When the second portion 34 of the adapter 14 is inserted into the first cavity 44 of the locking collar 16, the adapter 14 can rotate either clockwise or counter-clockwise relative to the locking collar 16.

Referring now to FIG. 9, the internal diameter $d_5$ of the first cavity 44 can be smaller than, equal to, or be greater than the internal diameter $d_6$ of the second cavity 46. Desirably, the internal diameter $d_5$ of the first cavity 44 is equal to the internal diameter $d_6$ of the second cavity 46. Alternatively, the internal diameter $d_5$ of the first cavity 44 can be less than or greater than the internal diameter $d_6$ of the second cavity 46.

The distance or clearance between the internal diameter $d_5$ of the first cavity 44 of the locking collar 16 and the external diameter $d_3$ of the second portion 34 of the adapter 14 should be relatively small. An interference fit is possible. By "interference fit" it is meant a tight fit. Desirably, the clearance between the internal diameter $d_5$ of the first cavity 44 and the external diameter $d_3$ of the second portion 34 of the adapter 14 ranges from between about 0.001 inches to about 0.01 inches. More desirably, the clearance between the internal diameter $d_5$ of the first cavity 44 and the external diameter $d_3$ of the second portion 34 of the adapter 14 ranges from between about 0.001 inches to about 0.008 inches. Even more desirably, the clearance between the internal diameter $d_5$ of the first cavity 44 and the external diameter $d_3$ of the second portion 34 of the adapter 14 ranges from between about 0.002 inches to about 0.006 inches. Still more desirably, the clearance between the internal diameter $d_5$ of the first cavity 44 and the external diameter $d_3$ of the second portion 34 of the adapter 14 ranges from between about 0.002 inches to about 0.005 inches. Most desirably, the clearance between the internal diameter $d_5$ of the first cavity 44 and the external diameter $d_3$ of the second portion 34 of the adapter 14 ranges from between about 0.002 inches to about 0.004 inches. This small clearance will permit the adapter 14 to rotate relative to the locking collar 16 while providing a snug fit between the two parts 14 and 16. This small clearance will increases the ability of the adapter 14 to handle side loading (sideward forces) relative to the locking collar 16. This is very important, for if the clearance between the adapter 14 and the locking collar 16 was much larger, the cargo tie-down 10 would not be as strong and could fail when large sideward forces are exerted on the cargo tie-down 10 during use.

Referring again to FIGS. 7 and 9, the locking collar 16 further has an outer circumference 48. The outer circumference 48 can be knurled, have an abrasive surface, be machined to have one or more rings, slots, grooves, etc., or be smooth. Desirably, the outer circumference 48 is knurled to aid in gripping. A pair of oppositely aligned flat surfaces 50 and 52 is formed in the outer circumference 48. The pair of oppositely aligned flat surfaces 50 and 52 is located 180° apart. The pair of oppositely aligned flat surfaces 50 and 52 is located adjacent to the first surface 38. Each of the pair of oppositely aligned flat surfaces 50 and 52 has a width w and a height $h_1$. The width w is the distance measured inward from the outer circumference, see FIG. 9. The height $h_1$ is the distance measured downward from the first surface 38.

The width w can vary in dimension. Desirably, the width w of each of the pair of oppositely aligned flat surfaces 50 and 52 measures at least about 0.05 inches. More desirably, the width w of each of the pair of oppositely aligned flat surfaces 50 and 52 measures at least about 0.075 inches. More desirably, the width w of each of the pair of oppositely aligned flat surfaces 50 and 52 measures at least about 0.1 inches. Even more desirably, the width w of each of the pair of oppositely aligned flat surfaces 50 and 52 measures at least about 0.125 inches.

The height $h_1$ can vary in dimension. Desirably, the height $h_1$ of each of the pair of oppositely aligned flat surfaces 50 and 52 is at least about 0.2 inches. More desirably, the height $h_1$ of each of the pair of oppositely aligned flat surfaces 50 and 52 is at least about 0.25 inches. Even more desirably, the height $h_1$ of each of the pair of oppositely aligned flat surfaces 50 and 52 is at least about 0.3 inches. Most desirably, the height h of each of the pair of oppositely aligned flat surfaces 50 and 52 is at least about 0.35 inches. The pair of oppositely aligned flat surfaces 50 and 52 provides structure for receiving or accommodating a wrench, such as a crescent wrench, in order to tighten and/or loosen the locking collar 16.

Figure 10:
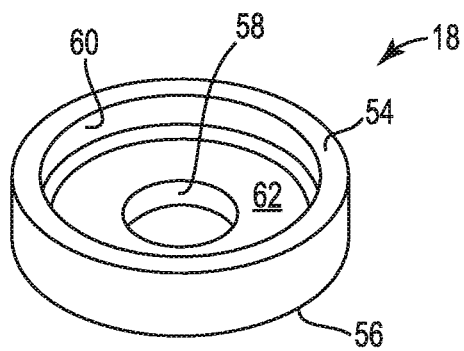
FIG. 10 is a perspective view of a disk.
Figure 11:
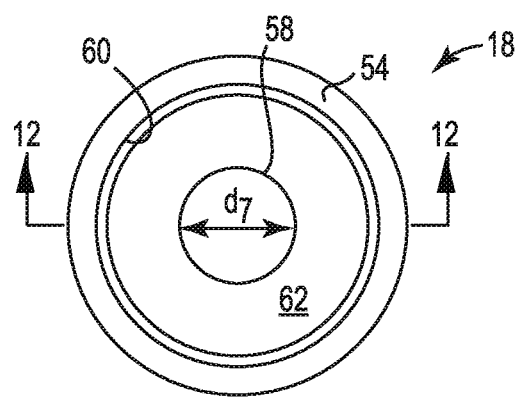
FIG. 11 is a top view of the disk shown in FIG. 10.
Figure 12:
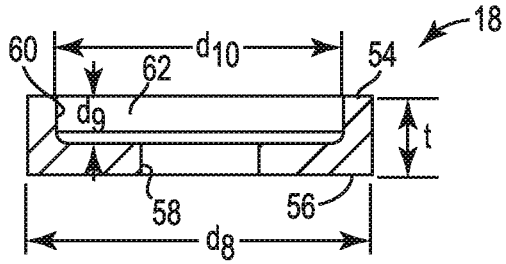
FIG. 12 is a cross-sectional view of the disk shown in FIG. 11 and taken along line 12-12.

Referring now to FIGS. 10-12, the cargo tie-down 10 further includes a disk 18. By "disk" it is meant a thin, flat, circular object or plate. Desirably, the disk 18 is circular in configuration. The disk 18 has a first surface 54, an oppositely aligned second surface 56, and has a non-threaded bore 58 formed therethrough. The non-threaded bore 58 has a smooth internal diameter $d_7$, see FIG. 11. The diameter $d_7$ of the non-threaded bore 58 should be equal to or be slightly larger than the diameters of each of the threaded bores 30 and 42 formed in the adapter 14 and in the locking collar 16, respectively. Desirably, the diameter $d_7$ of the non-threaded bore 58 is equal to the diameters of each of the threaded bores 30 and 42 formed in the adapter 14 and in the locking collar 16, respectively. The diameter $d_7$ of the non-threaded bore 58 should be at least about 0.2 inches. More desirably, the diameter $d_7$ of the non-threaded bore 58 should be at least about 0.25 inches. Even more desirably, the diameter $d_7$ of the non-threaded bore 58 should be at least about 0.3 inches. In addition, the non-threaded bore 58 is axially aligned with each of the treaded bores 30 and 42.

Referring to FIG. 12, the disk 18 is a relatively thin member having a thickness L. The thickness t can vary. Desirably, the thickness t is at least about 0.05 inches. More desirably, the thickness t is at least about 0.1 inches. Even more desirably, the thickness t ranges from between about 0.1 inches to about 0.25 inches. Most desirably, the thickness t is at least about 0.15 inches.

The disk 18 also has a cavity 60 formed adjacent to the first surface 54. The cavity 60 is shown having a circular cross-section. The cavity 60 has a depth $d_9$ which can vary in dimension.

Still referring to FIG. 12, the cavity 60 also has an internal diameter $d_{10}$ The internal diameter $d_{10}$ can vary in dimension. Desirably, the internal diameter $d_{10}$ is greater than about 0.5 inches. More desirably, the internal diameter $d_{10}$ is greater than about 0.6 inches. Even more desirably, the internal diameter $d_{10}$ is greater than about 0.7 inches. Most desirably, the internal diameter $d_{13}$ is greater than about 0.8 inches.

The cavity 60 also has a bottom wall 62. The bottom wall 62 can be flat, planar or smooth. The disk 18 further has an outer diameter $d_8$, which is sized to engage with and fit or mate with the internal diameter $d_6$ of the second cavity 46 formed in the locking collar 16. The outer diameter $d_8$ of the disk 18 can vary as long as it fits into the internal diameter $d_6$ of the second cavity 46 formed in the locking collar 16. When the outer diameter $d_8$ of the disk 18 measures about 0.95 inches, the internal diameter $d_6$ of the second cavity 46 of the locking collar 16 can measure about 0.98 inches. In other words, the disk 18 should freely fit into the diameter $d_6$ of the second cavity formed in the locking collar 16. The outer diameter $d_8$ of the disk 18 can range from between about 0.01 inches to about 0.1 inches less than the internal diameter $d_6$ of the second cavity 46 formed in the locking collar 16 can vary. Desirably, the outer diameter $d_8$ of the disk 18 is at least about 0.02 inches less than the internal diameter $d_6$ of the second cavity 46 formed in the locking collar 16 can vary. More desirably, the outer diameter $d_8$ of the disk 18 is at least about 0.025 inches less than the internal diameter $d_6$ of the second cavity 46 formed in the locking collar 16 can vary. Even more desirably, the outer diameter $d_8$ of the disk 18 is at least about 0.03 inches less than the internal diameter $d_6$ of the second cavity 46 formed in the locking collar 16 can vary.

Figure 13:
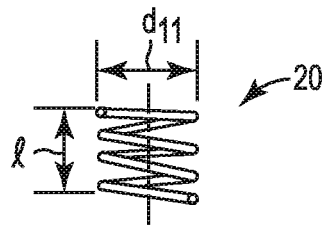
FIG. 13 is a side view of a coil spring.

Referring now to FIGS. 3 and 13, the cargo tie-down 10 also includes a spring 20. The spring 20 can vary in design. Desirably, the spring 20 is a coil spring. By "coil spring" it is meant a series of connected spirals or concentric rings formed by winding a metal wire. The spring 20 has a length l and an outer diameter $d_{11}$. The length l can vary in dimension. Normally the length l is at least about 0.2 inches long. Desirably, the length l of the spring 20 can range from between about 0.25 inches to about 1 inch for a cargo tie down 10 designed to be used on a pick-up truck. It should be understood, that as the overall size of the cargo tie-down 10 increases, the size of the components which are assembled to construct the cargo tie-down 10 will also increase in dimension.

The outer diameter $d_{11}$ of the spring 20 can also vary. The outer diameter d of the spring 20 will be less than the internal diameter $d_{10}$ of the cavity 60. Desirably, the outer diameter $d_{11}$ of the spring 20 will be about 0.5 inches. More desirably, the outer diameter $d_{11}$ of the spring 20 will be less than about 1 inch. The spring 20 is positioned in the second cavity 46 of the locking collar 16 and contacts the bottom wall 62 of the disk 18. The disk 18 functions to bias the disk 18 downward away from the locking collar 16.

The compressive strength of the spring 20 can also vary depending on the size, construction and application of the cargo tie-down 10. The cargo tie-down 10 can be constructed for heavy duty use, for standard duty use or for light duty use. Typically, the spring 20 will exert a force of at least about 2 pounds against the disk 18 for a standard size cargo tie-down 10. Desirably, the spring 20 will exert a force of from between about 2 pounds to about 10 pounds against the disk 18 for a standard size cargo tie-down 10. More desirably, the spring 20 will exert a force of from between about 2 pounds to about 7 pounds against the disk 18 for a standard size cargo tie-down 10. Even more desirably, the spring 20 will exert a force of at least about 2.5 pounds against the disk 18 for a standard size cargo tie-down 10. Most desirably, the spring 20 will exert a force of at least about 3 pounds against the disk 18 for a standard size cargo tie-down 10.

It should be understood that the compressive strength of the spring 20 can be adjusted to suit one's particular needs.

Figure 14:
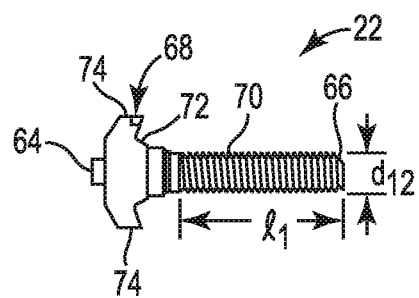
FIG. 14 is a side view of a T-shaped threaded stud.
Figure 15:
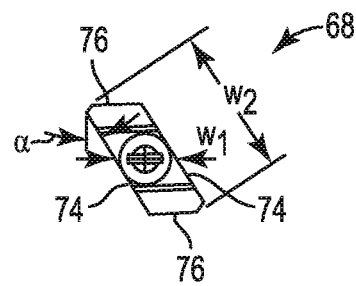
FIG. 15 is an end view of the T-shaped collar shown in FIG. 14 looking left.

Referring now to FIGS. 3, 14 and 15, a T-shaped threaded stud 22 is shown having a first end 64 and an oppositely aligned second end 66. An outwardly extending flange 68 is formed on or adjacent to the first end 64. The flange 68 has an inner surface 72. The inner surface 72 can be planar or be shaped to have a concave, stepped or have a non-planar configuration. The inner surface 72 can assist the flange 68 with engaging with the rail 12 which will be explained in greater detail below. The flange 68 can be integrally formed on or be attached to the T-shaped threaded stud 22. Desirably, the flange 68 is integral formed on the T-shaped threaded stud 22. The T-shaped threaded stud 22 also contains threads 70. The threads 70 extend from the flange 68 to the second end 66. Alternatively, the threads 70 can be spaced slightly apart from the inner surface 72 of the flange 68. The threads 70 have an outside diameter $d_{12}$. The outside diameter $d_{17}$ of the threads 70 should correspond to the internal threads formed in the threaded bores 30 and 42.

The threads 70 extend over a length $l_1$ on the T-shaped threaded stud 22. The length $l_1$ can vary in dimension. Desirably, the length $l_1$ is at least about 0.75 inches. More desirably, the length $l_1$ is at least about 1 inch. Even more desirably, the length $l_1$ is greater than about 1 inch.

Still referring to FIGS. 14 and 15, the flange 68 is configured as a parallelogram. By "parallelogram" it is meant a four-sided plane figure with opposite sides parallel. Desirably, the flange 68 is configured as a parallelepiped. By "parallelepiped" it is meant a solid with six faces, each a parallelogram and each being parallel to the opposite face. The flange 68 is constructed to have a pair of sidewalls 74, 74, and a pair of end walls 76, 76. Each of the pair of sidewalls 74, 74 is aligned parallel to one another. Each of the pair of end walls 76, 76 is also aligned parallel to one another. The pair of sidewalls 74, 74 is separated from each other by a width $w_1$. The width $w_1$ is equal to or approximately equal to the outside diameter $d_{17}$ of the threads 70.

Referring to FIG. 15, the maximum distance between the pair of end walls 76, 76 is defined as a width $w_2$. This width $w_2$ is measured across the opposite corners of the flange 68.

Each of the pair of end walls 76, 76 is aligned at an angle alpha α to the pair of sidewalls 74, 74, see FIG. 15. The angle alpha α can range from between about 5° to about 75°. Desirably, the angle alpha α can range from between about 10° to about 45°. More desirably, the angle alpha α is at least about 20°. Even more desirably, the angle alpha α is at least about 25°. Most desirably, the angle alpha α is at least about 30°.

The inner surface 72 of the flange 68 can be flat or planar. Desirably, the inner surface 72 of the flange 68 is non-planar. For example, the inner surface 72 can be contoured, be stepped or contain grooves.

Referring again to FIGS. 2 and 3, the second end 66 of the T-shaped threaded stud 22 is designed to pass through the non-threaded bore 58, formed in the disk 18, and be threaded through the threaded bore 42, formed in the locking collar 16. The T-shaped threaded stud 22 is also designed to be threaded into at least a portion of the threaded bore 30 formed in the adapter 14. The T-shaped threaded stud 22 can be threaded into the threaded bore 30 of the adapter 14 until the inner surface 72 of the flange 68 contacts or approaches the second surface 56 of the disk 18. In this position, the second end 66 of the T-shaped threaded stud 22 will be located within the threaded bore 30 of the adapter 14. As depicted in FIG. 3, the second end 66 of the T-shaped threaded stud 22 is shown being located about in the middle of the threaded bore 30.

It should be understood that the length $l_1$ of the threads 70 will partially dictate the location of the second end 66.

Referring again to FIGS. 1-3, the cargo tie-down 10 further includes an attachment member 24 having a first end 78 and an oppositely aligned second end 80. The first end 78 has a fitting 82 secured thereto. The fitting 82 can be any desired shape and size. The fitting 82 can be a loop, a closed loop, an open loop, a closable loop such as a carabiner, a hook, a ring, a D-ring, a clip, an eye or any other structure through which ropes, cords, straps, chains, metal bands, and the like, can be fastened to secure, lash or bind the cargo load in place. By "carabiner" it is meant an oblong metal ring with a spring clip, used in mountaineering to attach a running rope to a piton or similar device. A carabiner is a loop fitting 82 that can be opened when needed. The carabiner can be closed and can be secured in a closed position by a threaded collar (not shown).

The fitting 82 can be permanently closed or be capable of being opened. As depicted in FIG. 1, the fitting 82 is an inverted U-shape closed loop. However, the fitting 82 could have any other desired geometrical configuration. The fitting 82 could have a semi-circular configuration, a circular configuration, a square configuration, a rectangular configuration, a triangular configuration or any other irregular configuration known to one skilled in the art. In addition, the fitting 82 could be a carabiner. The attachment member 24 also includes a fastener 84, such as a screw, a bolt, a nut, a hex nut, etc. which will secure the fitting 82 to the cargo tie-down 10. In FIG. 1, the fastener 84 is depicted as a hex screw having an enlarged head with a hex shaped opening formed therein. By "hex" it is meant a six sided opening. An alien wrench can be used to tighten or loosen the fastener 84.

The second end 80 of the attachment member 78 has a threaded stud 86 extending outward therefrom. The threaded stud 86 is sized to engage with the threaded bore 30 formed in the adapter 14. The threaded stud 86 has a length $l_2$ sufficient to contact the second end 66 of the T-shaped threaded stud 22 and causes the adapter 14 and the T-shaped threaded stud 22 to move in unison. By "unison" it is meant the ability to move at the same time; at once. The length $l_2$ can vary in length. Desirably, the length $l_2$ of the threaded stud 86 is at least about 0.25 inches. More desirably, the length $l_2$ of the threaded stud 86 is at least about 0.4 inches. Even more desirably, the length $l_2$ of the threaded stud 86 is at least about 0.5 inches. Most desirably, the length $l_2$ of the threaded stud 86 ranges from between about 0.25 inches to about 0.75 inches. The threads 88 formed on the threaded stud 86 should be capable of engaging the threads formed in the threaded bore 30.

Figure 16:
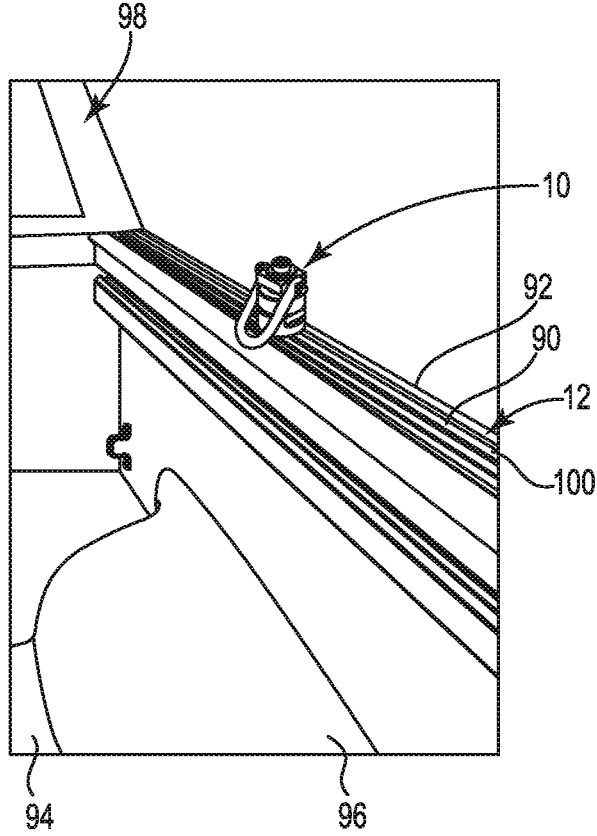
FIG. 16 is a perspective view of a cargo tie-down secured to a side rail formed on a pick-up truck.

Referring now to FIGS. 1-3 and 16, a rail 12 is shown. The rail 12 can vary in shape. The rail 12 can be an elongated bar 90, as depicted, or be an elongated tube, an elongated relatively flat member, etc. The rail 12 can be secure to any portion or surface of a movable member. As depicted in FIG. 16, the rail 12 is secured to a sidewall 92 of a bed 94 of a pick-up truck 98. However, the rail 12 could be secured to the bottom 96 of the bed 94 or to some other portion or surface of the moving member. Multiple rails 12, 12 can be secured to various portions or surfaces of a movable member. Generally, a pair of rails 12, 12 are mounted on the opposite sidewalls 94, 94 of the bed 96 of a pick-up truck 98 so that ropes, straps, bands, etc. can secure a cargo load positioned in the bed 96 of the pick-up truck 98.

Each rail 12 includes one or more outside walls 100. When the rail 12 has a square cross-section, as shown in FIGS. 1-3, the rail 12 will have four outside walls 100, 100, 100 and 100. In some applications, only one outside wall 100 is required. An elongated channel 102 is formed in at least one of the outside walls 100, 100, 100 and 100. Alternatively, the rail 12 may only have one outside wall 100 and a single elongated channel 102 is formed in this outside wall 100. The elongated channel 102 is a narrow opening or slot that opens into an enlarged cavity 104. The elongated channel 102 has a width $w_3$, see FIG. 2. The enlarged cavity 104 is located inward from the outside wall 100. Multiple enlarged cavities 104, 104, 104 and 104 can be present in each rail 12. Each enlarged cavity 104 can have any desired geometrical shape. As shown in FIGS. 1-3, each of the four enlarged cavities 104, 104, 104 and 104 has a semi-circular cross-sectional configuration. Each cavity 104 has a maximum width $w_4$, see FIG. 2. The width $w_4$ of each of the cavities 104, 104, 104 and 104 is sized to be larger than the width $w_3$ of the elongated channel 102. Furthermore, the width $w_4$ of each of the cavities 104, 104, 104 and 104 is a smaller dimension than the width $w_2$ of the flange 68. This is important for it means that the flange 68 cannot rotate 360° within the cavity 104. The width $w_4$ of each of the cavities 104, 104, 104 and 104 is less than about 0.75 inches when the cargo tie-down 10 is sized to be used in a rail 12 secured to a pick-up truck 98. Desirably, the width $w_4$ of each of the cavities 104, 104, 104 and 104 is less than about 0.7 inches. More desirably, the width $w_4$ of each of the cavities 104, 104, 104 and 104 is greater than about 0.5 inches. Even more desirably, the width $w_4$ of each of the cavities 104, 104, 104 and 104 ranges from between about 0.5 inches to about 0.7 inches. Most desirably, the width $w_4$, of each of the cavities 104, 104, 104 and 104 is less than about 0.65 inches.

The elongated channel 102 is defined by a pair of laterally facing projections 106, 106 which cooperate with the enlarged cavity 104 to form an inverted, generally T-shaped passage. The width $w_3$ of the elongated channel 102 can vary in dimension. Desirably, the width $w_3$ of the elongated channel 102 will be at least about 0.2 inches, when the cargo tie-down 10 is sized to be attached to the sidewall 94 of a pick-up truck 98. More desirably, the width $w_3$ of the elongated channel 102 can range from between about 0.2 inches to about 0.4 inches. Even more desirably, the width $w_3$ of the elongated channel 102 can range from between about 0.2 inches to about 0.35 inches. Most desirably, the width $w_3$ of the elongated channel 102 can be at least about 0.25 inches.

The width $w_3$ of the elongated channel 102 is larger than the width $w_1$, see FIG. 15, separating the pair of sidewalls 72, 72 of the flange 68 formed on the T-shaped threaded stud 22. This means that the flange 68 can easily fit into the width $w_3$ of the elongated channel 102 when the flange 68 is rotated such that the width $w_1$ of the flange 68 lines up with or is parallel to the width $w_3$ of the elongated channel 102.

The pair of laterally facing projections 106, 106 form an interior surface 108. Desirably, the interior surface 108 is non-planar in configuration. The interior surface 108 can be slanted, be concave, or have an irregular configuration. The inner surface 72 of the flange 68 is designed to mate with or engage with the interior surface 108 of the pair of laterally facing projections 106, 106.

As recited above, the width $w_2$ of the flange 68 is the maximum distance between the pair of end walls 76, 76. This width $w_2$ is measured across the opposite corners of the flange 68. The width $w_2$ of the flange 68 is a greater dimension and longer than the width $w_3$ of the elongated channel 102. More importantly, the width $w_2$ of the flange 68 is a greater dimension and longer than the width $w_4$ of each of the cavities 104, 104, 104 and 104. This size difference prevents the flange 68 from rotating in each of the cavities 104, 104, 104 and 104. Desirably, this size difference between the width $w_2$ and the width $w_4$ will prevent the flange 68 from turning or rotating more than about 50° within one of the cavities 104, 104, 104 and 104. If the flange 68 could turn or rotate 90° or more, within one of the cavities 104, 104, 104 and 104, then one would not be assured that a secure connection occurred between the cargo tie-down 10 and the rail 12. More desirably, the size difference between the width $w_2$ and the width $w_4$ will prevent the flange 68 from turning or rotating more than about 45° within one of the cavities 104, 104, 104 and 104. Even more desirably, the size difference between the width $w_2$ and the width $w_4$ will allow the flange 68 to turn or rotate from between about 5° and about 45° within one of the cavities 104, 104, 104 and 104. Most desirably, the size difference between the width $w_2$ and the width $w_4$ will allow the flange 68 to turn or rotate from between about 10° and about 45° within one of the cavities 104, 104, 104 and 104.

Once the flange 68 is inserted into the elongated channel 102, the cargo tie-down 10 is depressed against the spring 20. This action will enable the flange 68 to move away from the second surface 56 of the disk 18. This separation allows the pair of end walls 76, 76 of the flange 68 to turn or rotate from between about 0° to about 45°. Such rotation will cause the pair of end walls 76, 76 to be positioned below a plane of the pair of laterally facing projections 106, 106. As soon as one stops pressing down on the cargo tie-down 10, the spring 20 will relax and the pair of end walls 76, 76 will contact the interior surface 108 of one of the cavities 104, 104, 104 and 104 and lock the cargo tie-down 10 to the rail 12.

The flange 68 is sized to be easily inserted into the elongated channel 102. As the spring 20 is compressed, the pair of end walls 76, 76 will be positioned below a plane of the pair of laterally facing projections 106, 106. Rotation of the flange 68 causes the pair of end walls 76, 76 to move under the pair of laterally facing projections 106, 106. As the spring 20 is relaxed, a secure connection is formed as the pair of end walls 76, 76 contacts and engages the pair of laterally facing projections 106, 106. The width $w_2$ of the flange 68 will prevent the T-shaped threaded stud 22 from rotating more than about 45° in the cavity 104. The tension in the spring 20 will prevent the flange 68 from rotating in a reverse direction. Thus, the T-shaped threaded stud 22 will be tightly secured in the cavity 104 and will not accidentally loosen or become dislodged under the most rigorous conditions.

The cargo tie down 10 can also be quickly and easily removed from the rail 12 by reversing the procedure used to attach the cargo tie-down 10 to the rail 12. The cargo tie-down 10 can be pressed downward which will cause the spring 20 to compress. This action separates the pair of end walls 76, 76 of the flange 68 from the interior surface 108 of the enlarged cavity 104. The cargo tie-down 10 can then rotated counter-clockwise or in an opposite direction to that used to affix the cargo tie-down 10 to the rail 12. This action causes the pair of end walls 76, 76 of the flange 68 to again become aligned parallel with the width $w_3$ of the elongated channel 102. The cargo tie-down 10 can then be withdrawn from the elongated channel 102 of the rail 12. The cargo tie-down 10 can be stored, such as in a box, cabinet storage locker until needed again.

Method

A method of securing a cargo tie-down 10 to a rail 12 is also taught. The rail 12 has an elongated channel 102 with a narrow opening defined by a pair of laterally facing projections 106, 106 which connect with an enlarged cavity 104 formed in the rail 12. The enlarged cavity 104 has an interior surface 108. The cargo tie-down 10 includes an adapter 14 having a first surface 26, an oppositely aligned second surface 28, and a threaded bore 30 extending therethrough. The adapter 14 has a stepped outer circumference which forms a first portion 32 having an external diameter $d_2$, and a second portion 34 having an external diameter $d_3$. The second portion 34 is located adjacent to the second surface 28, and the external diameter $d_3$ of the second portion 34 is smaller than the external diameter $d_2$ of the first portion 32. A locking collar 16 is also present which has a first surface 38, an oppositely aligned second surface 40, and a threaded bore 42 formed therethrough. The locking collar 16 has a first cavity 44 formed therein adjacent to the first surface 38 and a second cavity 46 formed therein adjacent to the second surface 40. The first cavity 44 also has an internal diameter $d_5$ sized to rotatably mate with the external diameter $d_3$ of the second portion 34 of the adapter 14. The cargo tie-down 10 also includes a disk 18 having a first surface 54, an oppositely aligned second surface 56, and a bore 58 formed therethrough. The disk 18 has a cavity 60 formed adjacent to the first surface 54. The cavity 60 has a bottom wall 62. The disk 18 has an outer diameter $d_8$ which is sized to mate with the second cavity 46 of the locking collar 16. A spring 20 is positioned in the second cavity 46 of the locking collar 16 and contacts the bottom wall 62 of the disk 18. The cargo tie-down 10 also includes a T-shaped threaded stud 22 having a first end 64 and an oppositely aligned second end 66. The first end 64 has an outwardly extending flange 68. The T-shaped threaded stud 22 has threads 70 extending from the flange 68 to the second end 66. The threads 70 have an outside diameter $d_{12}$. The flange 68 has a pair of sidewalls 74, 74 and a pair of end walls 76, 76. The pair of sidewalls 74, 74 is separated by a width $w_1$ equal to the outside diameter $d_{12}$ of the threads 70. Each of the pair of end walls 76, 76 is aligned at an angle to the pair of sidewalls 74, 74. The cargo tie-down 10 further includes an attachment member 24 having a first end 78 and an oppositely aligned second end 80. The first end 78 has a fitting 82 secured thereto and the second end 80 has a threaded stud 84 extending outward therefrom. The threaded stud 84 is sized to be threaded into the threaded bore 30 formed in the adapter 14. The threaded stud 84 has a length $l_2$ sufficient to contact the second end of the T-shaped threaded stud 22 and cause the adapter 14 and the T-shaped threaded stud 22 to move in unison.

The method includes the steps of positioning the flange 68 of the T-shaped threaded stud 22 in the elongated channel 102. The cargo tie-down 10 is then depressed which causes the spring 20 to compress and allows the flange 68 to move downward into the enlarged cavity 104 and below a plane of the pair of laterally facing projections 106, 106. The flange 68 can then be rotated from between about 5° to about 45°. Lastly, the spring 20 is allowed to relax which causes the pair of end walls 76, 76, of the flange 68, to contact the interior surface 108 of the enlarged cavity 104 and lock the cargo tie-down 10 to the rail 12.

The method of removing the cargo tie-down 10 from the rail 12 is the same procedure in reverse.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cargo tie-down comprising:
   a) an adapter having a first surface, an oppositely aligned second surface, and a threaded bore extending therethrough, said adapter having a stepped outer circumference which forms a first portion having an external diameter and a second portion having an external diameter, said second portion is located adjacent to said second surface;
   b) a locking collar having a first surface, an oppositely aligned second surface, and having a threaded bore formed therethrough, said locking collar having a first cavity formed therein adjacent to said first surface and a second cavity formed therein adjacent to said second surface, and said first cavity having an internal diameter sized to rotatably mate with said external diameter of said second portion of said adapter;
   c) a disk having a first surface, an oppositely aligned second surface, and having a bore formed therethrough, said disk having a cavity formed adjacent to said first surface, said cavity having a bottom wall, and said disk having an outer diameter which is sized to mate with said second cavity formed in said locking collar;
   d) a spring positioned in said second cavity of said locking collar and which contacts said bottom wall of said disk;
   e) a T-shaped threaded stud having a first end and an oppositely aligned second end, said first end having an outwardly extending flange, and said T-shaped threaded stud having threads extending from said flange to said second end, said threads having an outside diameter, said flange having a pair of sidewalls and a pair of end walls, said pair of sidewalls are separated by a width equal to said outside diameter of said threads, and each of said pair of end walls aligned at an angle to said pair of sidewalls; and
   f) an attachment member positioned in said threaded bore of said adapter which contacts said second end of said T-shaped threaded stud and which causes said adapter and said T-shaped threaded stud to move in unison.

2. The cargo tie-down of claim 1 wherein said adapter has a cylindrical configuration and said first portion has a knurled outer circumference.

3. The cargo tie-down of claim 1 wherein said locking collar has a cylindrical configuration with a knurled outer circumference and having a pair of oppositely aligned flat surfaces formed thereon, said pair of oppositely aligned flat surfaces located adjacent to said first surface, and each of said pair of oppositely aligned flat surfaces has a width sized to accommodate a wrench.

4. The cargo tie-down of claim 1 wherein said first and second cavities formed in said locking collar have the same internal diameter.

5. The cargo tie-down of claim 1 wherein said second portion of said locking collar has a smooth outer surface.

6. The cargo tie-down of claim 1 wherein said threaded bore formed through said adapter, said threaded bore formed through said locking collar, and said bore formed through said circular disc are axially aligned.

7. The cargo tie-down of claim 6 wherein said threaded bore formed through said adapter has an internal diameter, said threaded bore formed through said locking collar has an internal diameter, and said internal diameter of said threaded bore formed through said adapter is equal in diameter to said internal diameter of said threaded bore formed through said locking collar.

8. The cargo tie-down of claim 7 wherein said bore formed through said disk has an internal diameter, and said internal diameter is equal to said internal diameters of said threaded bores formed through said adapter and said locking collar.

9. The cargo tie-down of claim 1 wherein said tie-down is formed from a metal, a metal alloy, steel, stainless steel, titanium, magnesium, manganese, zinc, brass, bronze, nickel, plastic, graphic, a glass-reinforced plastic or a composite material.

10. A cargo tie-down comprising:
    a) an adapter having a first surface, an oppositely aligned second surface, and a threaded bore extending therethrough, said adapter having a stepped outer circumference which forms a first portion having an external diameter and a second portion having an external diameter, said second portion is located adjacent to said second surface;
    b) a locking collar having a first surface, an oppositely aligned second surface, and having a threaded bore formed therethrough, said locking collar having a first cavity formed therein adjacent to said first surface and a second cavity formed therein adjacent to said second surface, and said first cavity having an internal diameter sized to rotatably mate with said external diameter of said second portion of said adapter;
    c) a disk having a first surface, an oppositely aligned second surface, and having a non-threaded bore formed therethrough, said disk having a cavity formed adjacent to said first surface, said cavity having a bottom wall, and said disk having an outer diameter which is sized to mate with said second cavity formed in said locking collar;
    d) a spring positioned in said second cavity of said locking collar and which contacts said bottom wall of said disk;
    e) a T-shaped threaded stud having a first end and an oppositely aligned second end, said first end having an outwardly extending flange, said T-shaped threaded stud having threads extending from said flange to said second end, said threads having an outside diameter, said flange having a pair of sidewalls and a pair of end walls, said pair of sidewalls are separated by a width equal to said outside diameter of said threads, and each of said pair of end walls aligned at an angle to said pair of sidewalls; and
    f) an attachment member having a first end and an oppositely aligned second end, said first end having a fitting secured thereto and said second end having a threaded stud extending outward therefrom, said threaded stud engaging with said threaded bore formed in said adapter, and said threaded stud having a length sufficient to contact said second end of said T-shaped threaded stud and cause said adapter and said T-shaped threaded stud to move in unison.

11. The cargo tie-down of claim 10 wherein said second portion of said adapter can rotate within said first cavity of said locking collar.

12. The cargo tie-down of claim 11 wherein said second portion of said adapter has a height and said first cavity of said locking collar has a depth, and said depth of said first cavity is less than said height of said second portion of said adapter.

13. The cargo tie-down of claim 10 wherein said pair of end walls is formed at an angle to said pair of sidewalls and said angle ranges from between about 5° to about 75°.

14. The cargo tie-down of claim 13 wherein said pair of end walls is aligned parallel to one another and each of said pair of end walls is formed at said angle of from between about 10° and about 45° to said pair of sidewalls.

15. The cargo tie-down of claim 10 wherein said tie-down is formed from yellow zinc dichromate.

16. In combination with a rail secure to a surface of a movable member, said rail comprising an elongated channel with a narrow opening defined by a pair of laterally facing projections which connect with an enlarged cavity formed therein, said enlarged cavity having an interior surface, and a cargo tie-down comprising: an adapter having a first surface, an oppositely aligned second surface, and having a threaded bore extending therethrough, said adapter having a stepped outer circumference which forms a first portion, having an external diameter, and a second portion, having an external diameter, said second portion is located adjacent to said second surface; a locking collar having a first surface, an oppositely aligned second surface, and having a threaded bore formed therethrough, said locking collar having a first cavity formed therein adjacent to said first surface and a second cavity formed therein adjacent to said second surface, and said first cavity having an internal diameter sized to rotatably mate with said external diameter of said second portion of said adapter; a disk having a first surface, an oppositely aligned second surface, and having a bore formed therethrough, said disk having a cavity formed adjacent to said first surface, said cavity having a bottom wall, and said disk having an outer diameter which is sized to mate with said second cavity of said locking collar; a spring positioned in said second cavity of said locking collar and which contacts said bottom wall of said disk; said cargo tie-down also includes a T-shaped threaded stud having a first end and an oppositely aligned second end, said first end having an outwardly extending flange, said T-shaped threaded stud having threads extending from said flange to said second end, said threads having an outside diameter, said flange having a pair of sidewalls and a pair of end walls, said pair of sidewalls are separated by a width equal to said outside diameter of said threads, each of said pair of end walls aligned at an angle to said pair of sidewalls; and an attachment member having a first end and an oppositely aligned second end, said first end having a fitting secured thereto and said second end having a threaded stud extending outward therefrom, said threaded stud sized to be threaded into said threaded bore formed in said adapter, and said threaded stud having a length sufficient to contact said second end of said T-shaped threaded stud and cause said adapter and said T-shaped threaded stud to move in unison.

17. The combination of claim 16 wherein said enlarged cavity formed in said rail has said interior surface and a width, and said flange has a width which is greater than said width of said enlarged cavity, and this difference in size prevents said flange from rotating more than about 50° in said enlarged cavity.

18. The combination of claim 17 wherein when said flange is inserted into said enlarged cavity formed in said rail and is positioned below a plane of said pair of laterally facing projections, and said flange can be rotated up to about 45° before contacting said interior surface of said enlarged cavity.

19. The combination of claim 16 wherein said flange is sized to be inserted into said elongated channel and can be positioned below a plane of said pair of laterally facing projections, and said flange can be rotated from between about 5° to about 45° before contacting said interior surface of said enlarged cavity, and once said spring is relaxed, said pair of end walls of said flange will lock said cargo tie-down to said rail.

20. The combination of claim 16 wherein each of said pair of laterally facing projections has an internal configuration, and said flange has an inner surface which is configured to mate with said internal configuration of each of said pair of laterally facing projections.

21. A method of securing a cargo tie-down to a rail, said rail having an elongated channel with a narrow opening defined by a pair of laterally facing projections which connect with an enlarged cavity formed in said rail, said enlarged cavity having an interior surface, and a cargo tie-down comprising an adapter having a first surface, an oppositely aligned second surface, and having a threaded bore extending therethrough, said adapter having a stepped outer circumference which forms a first portion, having an external diameter, and a second portion, having an external diameter, said second portion is located adjacent to said second surface; a locking collar having a first surface, an oppositely aligned second surface, and having a threaded bore formed therethrough, said locking collar having a first cavity formed therein adjacent to said first surface and a second cavity formed therein adjacent to said second surface, and said first cavity having an internal diameter sized to rotatably mate with said external diameter of said second portion of said adapter; a disk having a first surface, an oppositely aligned second surface, and having a bore formed therethrough, said disk having a cavity formed adjacent to said first surface, said cavity having a bottom wall, and said disk having an outer diameter which is sized to mate with said second cavity of said locking collar; a spring positioned in said second cavity of said locking collar and which contacts said bottom wall of said disk; the cargo tie-down also includes a T-shaped threaded stud having a first end and an oppositely aligned second end, said first end having an outwardly extending flange, said T-shaped threaded stud having threads extending from said flange to said second end, said threads having an outside diameter, said flange having a pair of sidewalls and a pair of end walls, said pair of sidewalls are separated by a width equal to said outside diameter of said threads, each of said pair of end walls aligned at an angle to said pair of sidewalls; and an attachment member having a first end and an oppositely aligned second end, said first end having a fitting secured thereto and said second end having a threaded stud extending outward therefrom, said threaded stud sized to be threaded into said threaded bore formed in said adapter, and said threaded stud having a length sufficient to contact said second end of said T-shaped threaded stud and cause said adapter and said T-shaped threaded stud to move in unison, said method comprising the steps of:

a) positioning said flange of said T-shaped threaded stud in said elongated channel;
b) depressing said cargo tie-down which causes said spring to compress and allows said flange to move downward into said enlarged cavity and below a plane of said pair of laterally facing projections;
c) rotating said flange from between about 5° to about 45°; and
d) allowing said spring to relax which causes said pair of end walls of said flange to contact said interior surface of said enlarged cavity and lock said cargo tie-down to said rail.

\* \* \* \* \*